United States Patent
Reid et al.

(10) Patent No.: US 11,905,187 B2
(45) Date of Patent: Feb. 20, 2024

(54) SYSTEM AND METHOD FOR REMOVAL OF RECALCITRANT ORGANIC COMPOUNDS FROM WATER

(71) Applicants: Terence K. Reid, Poplar Grove, IL (US); Peter G. Baumann, Roscoe, IL (US)

(72) Inventors: Terence K. Reid, Poplar Grove, IL (US); Peter G. Baumann, Roscoe, IL (US)

(73) Assignee: Aqua-Aerobic Systems, Inc., Loves Park, IL (US)

(*) Notice: Subject to any disclaimer, the term of this patent is extended or adjusted under 35 U.S.C. 154(b) by 0 days.

(21) Appl. No.: 17/709,657

(22) Filed: Mar. 31, 2022

(65) Prior Publication Data
US 2022/0220007 A1     Jul. 14, 2022

Related U.S. Application Data

(62) Division of application No. 16/293,251, filed on Mar. 5, 2019, now Pat. No. 11,827,537.

(51) Int. Cl.
| | |
|---|---|
| C02F 1/28 | (2023.01) |
| B01J 20/28 | (2006.01) |
| C02F 1/44 | (2023.01) |
| B01D 61/14 | (2006.01) |
| B01J 20/20 | (2006.01) |

(Continued)

(52) U.S. Cl.
CPC ............ C02F 1/283 (2013.01); B01D 61/147 (2013.01); B01J 20/20 (2013.01); B01J 20/28002 (2013.01); B01J 20/28016 (2013.01); C02F 1/444 (2013.01); B01D 2311/2523 (2022.08); B01D 2311/2626 (2013.01); B01D 2315/10 (2013.01); C02F 2101/322 (2013.01); C02F 2101/34 (2013.01); C02F 2101/36 (2013.01);

(Continued)

(58) Field of Classification Search
CPC .... C02F 1/283; C02F 1/444; C02F 2301/046; C02F 2101/36; C02F 2101/322; C02F 2103/06; C02F 2101/34; B01D 61/147; B01D 2315/10; B01D 2311/2626; B01D 71/024; B01D 2311/16; B01D 2313/40; B01D 2311/04; B01D 2311/25; B01J 20/20; B01J 20/28016; B01J 20/28002
See application file for complete search history.

(56) References Cited

U.S. PATENT DOCUMENTS

| | | | |
|---|---|---|---|
| 3,512,640 A | 5/1970 | Hellmann | |
| 5,505,841 A | 4/1996 | Pirbazari | |

FOREIGN PATENT DOCUMENTS

| | | |
|---|---|---|
| JP | H0747359 A | 2/1995 |
| KR | 20090005777 U | 6/2009 |

OTHER PUBLICATIONS

Prateek Pachauri et. al., Nature Environment and Pollution Technology • vol. 8, No. 3, pp. 481-488, 2009. (Year: 2009).*

(Continued)

*Primary Examiner* — Pranav N Patel
(74) *Attorney, Agent, or Firm* — Vitale, Vickrey, Niro, Solon & Gasey LLP

(57) ABSTRACT

The present inventions are directed to systems and methods to increase the removal of PFAS and other recalcitrant organic compound contaminants from water, and particularly ground and drinking water, using sub-micron powdered activated carbon.

6 Claims, 2 Drawing Sheets

(51) Int. Cl.
  *C02F 101/36* (2006.01)
  *C02F 101/32* (2006.01)
  *C02F 103/06* (2006.01)
  *C02F 101/34* (2006.01)

(52) U.S. Cl.
  CPC .... *C02F 2103/06* (2013.01); *C02F 2301/046* (2013.01)

(56) References Cited

OTHER PUBLICATIONS

Kumar et. al., Journal of Hazardous Materials 176 (2010) 774-783. (Year: 2010).*
Partlan, Erin, "Superfine Powdered Activated Carbon (S-PAC) Coupled with Microfiltration for the Removal of Trace Organics in Drinking Water Treatment" (2017). All Dissertations. 2011. (Year: 2011).*
English language machine translation of JP07047359A, 7 pages, No Date.*
Examination Report No. 2, dated Feb. 28, 2023, in corresponding Australian Application No. 2020233593.
International Search Report and Written Opinion dated May 7, 2020 in corresponding PCT Application No. PCT/US2020/019416.
Matsui et al., Adsorptive removal of geosmin by ceramic membrane filtration with super-powdered activated carbon, Journal of Water Supply: Research and Technology—AQUA, vol. 56, 2007.
Xiao, et al., Sorption of Poly- and Perfluoroalkyl Substances (PFASs) Relevant to Aqueos Film-Forming Foam (AFFF) Impacted Groundwater by Biochars and Activated Carbon, Environmental Science & Technology, vol. 51, 2017.

* cited by examiner

SYSTEM AND METHOD FOR REMOVAL OF RECALCITRANT ORGANIC COMPOUNDS FROM WATER

This application is a divisional of and claims priority to U.S. application Ser. No. 16/293,251, filed on Mar. 5, 2019, presently pending, which is incorporated herein in its entirety by reference.

FIELD OF THE INVENTION

The present inventions relate to systems and methods for removing recalcitrant organic compounds, including per and poly fluoroalkyl substances, from water. In particular, the present inventions relate to systems and methods for removing such contaminants from water using sub-micron powdered activated carbon in conjunction with ceramic membrane filtration. The present inventions also relate to systems and methods for the concentration and removal of the exhausted carbon.

BACKGROUND OF THE INVENTION

Per and poly fluoroalkyl substances ("PFAS"), including their precursors and related ranges, such as perfluorooctane sulfuric acid ("PFOS") and perfluorooctanic acid ("PFOA"), are compounds resistant to water and oil. They are man-made compounds that have been used in a wide variety of industries, including carpeting, upholstery and fire fighting foams. However, such compounds are bioaccumulative and known carcinogens and their removal from water, and particularly from ground water and drinking water, is an important environmental concern. Due to the strong fluorine-carbon bond, PFAS compounds are resistant to common treatment methods including biological and chemical oxidation.

One of the more common approaches to the removal of PFAS from water is granular activated carbon ("GAC") or powdered activated carbon ("PAC") treatment systems. As its name suggests, GAC uses granulated activated carbon to remove various contaminants, including organic recalcitrant compounds such as PFAS and others. In a typical GAC system, a tank contains the granulated activated carbon, the tank being of a sufficient size to retain the flow of water to be treated a sufficient time for the contaminants to react with the GAC. During the reaction, the PFAS and other organic compounds adhere to the surface of the granulated activated carbon, i.e., they are adsorbed by the granulated activated carbon.

After use, the adsorption of the organic contaminant compounds is reduced to such a point that the system is no longer effective. In other words, when the adsorption of contaminants is less than the desired treatment requirements, breakthrough is said to occur. At that point, the typical system must be shut down and the granulated activated carbon removed and properly remediated. Depending upon the contaminants filtered, the spent GAC, particularly with the adsorbed PFAS, must be hauled away and incinerated. In addition, because of the rapid breakthrough of GAC systems, and the need for frequent GAC regeneration and treatment, the operating costs for GAC treatment are relatively high. A relatively large plant footprint is also required for GAC treatment systems.

The ability of the GAC to adsorb contaminants, and the typical breakthrough time, is related to the mean particle diameter ("MPD") of the carbon. In conventional GAC systems, the MPD is approximately 1,600 microns. Even in systems using PAC, the MPD of the PAC is 45 microns or higher. In both GAC and PAC, PFAS adsorption is aided by the carbon's porous structure which includes macro-pores, micro-pores and meso-pores. The primary adsorption mechanism depends on the size of the contaminant, with macropores and mesopores having been found to be most important for PFAS removal. With the larger MPD for both GAC and PAC, access to the interior pores is limited and can result in breakthrough despite the available surface area for adsorption deep within the carbon particle. As indicated, breakthrough times are decreased with the larger MPD and carbon removal and disposal costs are increased. In addition, typical GAC systems do not effectively remove short chain length (i.e., 4, 6 and 7 carbon chained) PFAS compounds.

Thus, there is a need to increase the removal of PFAS and other recalcitrant organic compound contaminants from water, and particularly ground and drinking water. There is also a need to increase the breakthrough time of typical GAC filtration systems and to decrease the burden and expense of used material disposal. In the present inventions, it has been determined that use of sub-micron powdered activated carbon ("SPAC") and its smaller particle size provides higher surface area and increased quantity of mesopores, resulting in a lower usage rate and faster adsorption, requiring smaller volumes. SPAC is also more effective at removing short chain PFAS, for which known treatments are ineffective. The greater surface area and improved access to mesopores and macropores provided with SPAC and the present inventions has shown to increase PFAS adsorption by more than 500 times that of GAC based upon a given amount of carbon. In addition, the present inventions provide for the thickening or concentration of spent SPAC to reduce the disposal costs.

SUMMARY OF THE INVENTION

Accordingly, the present inventions preserve the advantages of known PFAS removal systems and methods and also provide new features and advantages.

An object of the present invention is to use sub-micron powdered activated carbon ("SPAC") to remove recalcitrant organic compound contaminants from water, the contaminants including PFAS, 1, 4-dioxane, BTEX and many others.

Another object of the present invention is to provide a sorption reactor, and preferably a pressurized sorption reactor, to provide a detention time for the SPAC and water slurry sufficient for the SPAC to adsorb the contaminants from the influent of water to be treated.

An additional object of the present invention is to use a ceramic membrane filter, and preferably a high velocity cross-flow ceramic membrane filter, to separate the filtered water from the SPAC with adsorbed contaminants and to return a portion of the bulk liquid to the sorption reactor.

A further object of the present invention is to increase SPAC recovery and concentration to reduce the removal and disposal of used SPAC.

Still an additional object of the present invention is to maintain the SPAC in a closed loop system as treated water is separated from the SPAC using high strength, high velocity cross-flow ceramic membrane filters and a bleed and feed SPAC conservation and recovery system.

Still another object of the present invention is to scour and clean the membranes of the ceramic membrane filtration system while filtering the treated water from the SPAC and its adsorbed contaminants.

Still a further object of the present invention is to use a ceramic membrane filter to retain SPAC in the system so that it may continue to remove soluble and recalcitrant organic compounds, including PFAS.

Yet another object of the present invention is to use a high velocity cross-flow ceramic membrane filter to reduce backwash frequency and backwash waste.

Yet a further object of the present invention is to maximize contaminant adsorption and to reduce SPAC usage and disposal.

Still yet another object of the present invention is to concentrate spent SPAC to reduce the frequency and amount of removal and/or disposal.

In accordance with the objects of the present invention, a method for removing contaminants from water is provided. The steps include: adding sub-micron powdered activated carbon (SPAC) to an influent flow of water to be treated; combining the SPAC with the water to be treated; introducing a SPAC and water mixture or slurry into a sorption reactor for treatment; permitting the mixture to remain in the sorption reactor for a sufficient detention time for the SPAC to adsorb contaminants in the water; and transferring the mixture or slurry from the sorption reactor using a recycle pump to a high velocity ceramic membrane filter unit operating in cross-flow filtration wherein the treated water is discharged as permeate and the SPAC slurry is returned to the sorption reactor as retentate. The method may also include removing the SPAC and adsorbed contaminant concentrate from the ceramic membrane filter via a concentrate line upon the SPAC reaching breakthrough; and adding new SPAC to the influent flow of water to continue contaminant removal. Further, in the preferred method, the SPAC and adsorbed contaminants are thickened for removal by terminating the influent flow to the sorption reactor and continuing operation of the recycle pump until the retentate is thickened and is thereafter removed via the concentrate line for disposal. The membranes of the ceramic membrane filter have a nominal pore size barrier of approximately 0.1 microns. In a preferred method, the influent flow is 1 Qi and the mixture of SPAC and influent is pumped at 10 times the influent (10 Qi) from the sorption reactor to the ceramic membrane filter. Also as preferred, the permeate is discharged at a rate of 1 times the influent flow (1 Qi) from the ceramic membrane filter and the retentate is returned to the sorption reactor at a rate of Qr, which is preferably 9 times the influent flow (9 Qi). Preferably, the SPAC has a mean particle diameter below approximately 1 micron.

Also provided is a system for removing contaminants, including PFAS, from water. The system includes: a pressurized sorption reactor in fluid communication with an influent line, and a SPAC feed line in communication with the influent line to add SPAC to the influent, the sorption reactor receiving an influent flow of water to be treated and sub-micron powdered activated carbon (SPAC), the sorption reactor capable of retaining the influent and SPAC slurry a sufficient retention time so that the contaminants to be removed are adsorbed by the SPAC in the slurry; a slurry effluent line in communication with a discharge of the sorption reactor and a recycle pump in the slurry effluent line; a cross-flow ceramic membrane filter in fluid communication with the slurry effluent line of the sorption reactor, the recycle pump transferring the SPAC with adsorbed contaminants at a high flow rate to the ceramic membrane filter unit which separates treated water from the contaminant-adsorbed SPAC as permeate; a permeate line in fluid communication with the ceramic membrane filter for removing the treated water as permeate; a retentate line in fluid communication with the ceramic membrane filter and the sorption reactor to return the SPAC slurry to the influent line; and a concentrate line for removing SPAC upon breakthrough. The preferred system uses SPAC that has a mean particle diameter below approximately 1 micron on wherein the ceramic membrane filter has a nominal pore size barrier of approximately 0.1 micron.

An embodiment of the system may also include a SPAC feed system in fluid communication with the influent line.

Inventor's Definition of the Terms

The following terms which may be used in the various claims and/or specification of this patent are intended to have their broadest meaning consistent with the requirements of law:

"Influent" or "influent flow" (also referred to as Qi) as used herein refers to the liquid (water or wastewater) to be treated that is introduced into the contaminant removal system.

"Permeate" or "filtrate" as used herein shall refer to the treated fluid or fluid flow after treatment with the contaminant removal system and separation of the SPAC and its adsorbed contaminants.

"Retentate" or "retentate flow (Qr)" as used herein refers to the SPAC containing bulk liquid or slurry from which the permeate or filtrate has been removed.

"SPAC" as used herein refers to sub-micron, or super-fine powdered activated carbon, preferably wood based, and preferably with a mean particle diameter below approximately 1 micron.

"PFAS" as used herein refer to a broad range of per or poly fluoroalkyl substances, including perflourooctane sulfonic acid (PFOS) and perflourooctanoic acid (PFOA), as well as short chain perflouroalkyl acids (PFAA) and its precursors. PFAS as used herein may also refer generally to other recalcitrant organic compounds.

"Breakthrough" as used herein refers to the SPAC that is no longer capable of adsorbing sufficient levels of contaminants for desired and effective treatment.

Where alternative meanings are possible, in either the specification or claims, the broadest meaning is intended consistent with the understanding of those of ordinary skill in the art. All words used in the claims are intended to be used in the normal, customary usage of grammar, the trade and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which.

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

Figure 1:
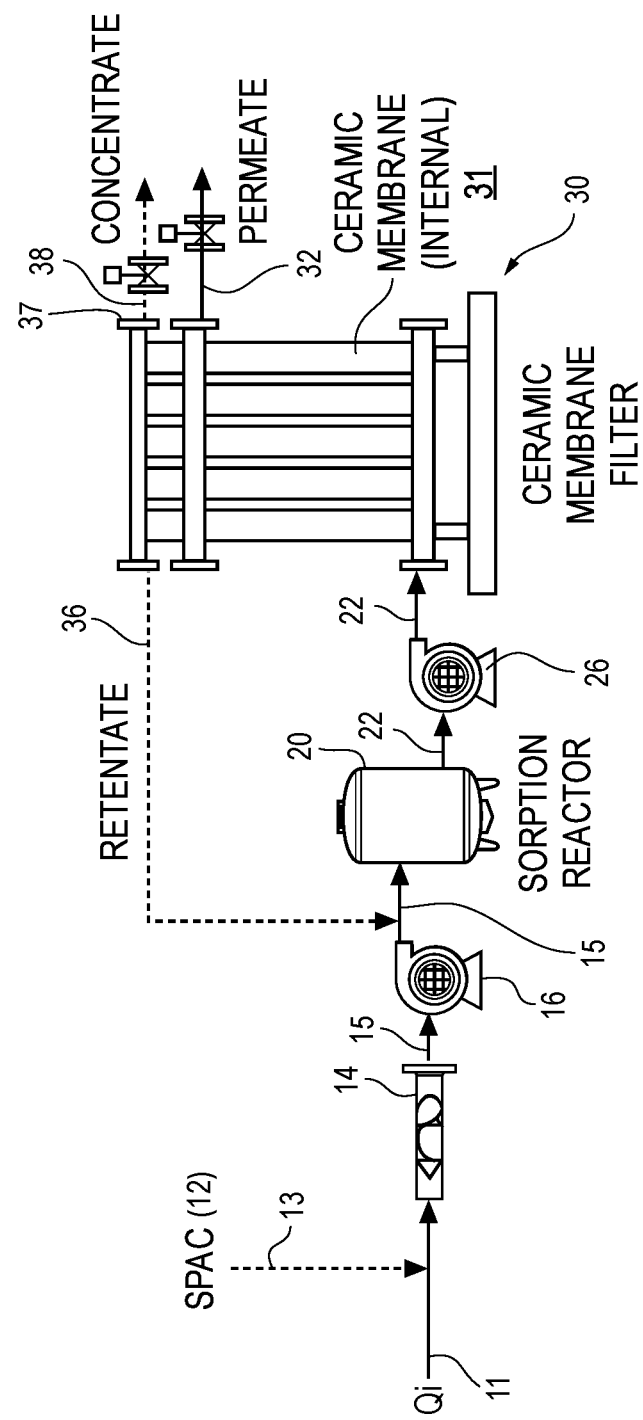
FIG. 1 is a schematic view of the preferred contaminant removal system of the present invention in its basic form.

The preferred PFAS removal system and method of the present inventions is shown in its basic form in FIG. 1. The system includes an influent line 11 that introduces the flow (Qi) of influent of water to be treated into the system. SPAC 12 is added to the influent (Qi) via a SPAC feed line 13, typically using a carbon feed assembly or other means as hereinafter described. A mixer 14 may optionally be included to help mix the influent water and the SPAC 12 forming the bulk liquid or slurry to be treated. The SPAC 12 and influent slurry is then pumped by a feed pump 16 through slurry feed line 15 to a sorption reactor 20. Feed pump 16 is sized to pump the influent flow and SPAC slurry at a designed flow rate (Qi). Feed pump 16 pumps the influent at Qi with the SPAC slurry to sorption reactor 20 via slurry feed line 15.

In a preferred embodiment, the systems and method utilize a wood based SPAC 12 having a mean particle diameter (MPD) below approximately 1 micron. The use of the sub-micron powdered particles provides a higher exterior surface area per unit mass and increased quantity of and access to mesospores contained in the particles to permit faster, more effective contaminant adsorption. It also permits greater contaminant exposure and a lower ratio of usage. As a result, it has proven effective in, among other things, short chain PFAS removal.

SPAC 12 is not believed to be currently a stocked, readily available material because of its relatively low current demand. However, it may be readily manufactured from GAC and/or PAC, of which there are many known manufacturers as will be understood by those of skill in the art. Some known GAC/PAC manufacturers include Asbury Carbons, Inc., Nalco Water and Calgon Carbon. These and other GAC/PAC manufacturers also have grinding processes available to produce SPAC. For example, Asbury Carbon has a readily available grinding process that can product SPAC from GAC or PAC with very little lead time. Thus, the sources of SPAC of the present inventions are readily available to those of skill in the art.

In a preferred embodiment, the SPAC 12 will be manufactured and shipped to the treatment site in a liquid slurry for ease of handling and ultimate use. For example, a 10% slurry of 1 micron SPAC and water (100 grams of Carbon/liter) has been found to be desirable for use in the present inventions. As hereinafter described, the original SPAC 12 slurry is further diluted by the influent water to be treated to the working concentration to be transferred to the sorption reactor 20. In a preferred embodiment where the SPAC slurry is 100 grams of carbon/liter, the slurry is diluted to approximately 0.5 to 2 grams of carbon/liter in the sorption reactor 20. These concentrations are merely illustrative and not limitations.

Sorption reactor 20 is the vessel in which, among other things, the water to be treated is in contact with the SPAC 12 or SPAC slurry a sufficient time so that the PFAS may be adsorbed by the SPAC 12. The sorption tank 20 serves as a reaction chamber for the SPAC 12 and water to be treated such that the PFAS and other contaminants are adsorbed by the SPAC 12 in the sorption tank 20. The sorption reactor 20 provides a desired and/or designed detention time of the SPAC/influent slurry such that the PFAS and other contaminants may be sufficiently adsorbed by the SPAC 12.

In a preferred embodiment, the sorption reactor 20 is sized to accommodate at least ten times the influent flow (10 Qi) as hereinafter described. It will be understood by those of skill in the art that sorption reactor 20 is also sized to provide a desired detention time to aid the SPAC's adsorption of PFAS and other contaminants. The larger the sorption reactor 20 at a given flow, the longer the detention time it is capable of providing. In a preferred embodiment, a detention time of between 30-60 minutes at the influent flow (Qi) has been determined to be satisfactory for the reaction between the SPAC and the PFAS in the influent having an exemplary influent from (Qi) of 100 gallons/minute. Other detention times will also suffice depending upon the desired treatment parameters and influent flows. Thus, in a system where Qi is 100 gallons/minute and a detention time in sorption reactor 20 is one hour, sorption reactor 20 must accommodate at least 6,000 gallons.

A preferred sorption reactor 20 of the present invention is a pressurized tank that is closed to the atmosphere. To prevent short-circuiting, baffles 21 (see FIG. 2) may be included in the sorption reactor 20. It will be understood by those of skill in the art that non-pressurized tanks may be utilized. However, such tanks would have to be relatively tall and/or would require a substantially larger energy requirement.

The SPAC adsorbs the PFAS and other contaminants in sorption reactor 20. After sufficient detention time in the sorption reactor 20, the SPAC and bulk liquid reacted slurry is then pumped via slurry effluent line 22 to a ceramic membrane filter unit 30 using a recycle pump 26. In the preferred embodiment, the recycle pump 26 is sized to pump ten times the influent flow (10 Qi) through slurry effluent line 22 to ceramic membrane filter 30.

The ceramic membrane filter unit 30 provides important unique functions of the present inventions. First, the ceramic membrane filter 30 separates the SPAC and adsorbed contaminants from the treated liquid to be removed as clean permeate via permeate line 32. The ceramic membrane filter also returns SPAC slurry to the sorption reactor 20 for further treatment of influent which reduces SPAC consumption. Third, the ceramic membrane filter 30 also serves to concentrate and thicken the SPAC 12 upon breakthrough or exhaustion that aids in SPAC 12 disposal, without the need for complicated additional equipment.

In a preferred embodiment, the ceramic membrane filter 30 has a 0.1 micron nominal pore size barrier. The small pore size results in high permeability and reduced pressure loss across each membrane of the ceramic membrane filter 30. As will be understood by those of skill in the art, suitable ceramic membrane filters 30 are available from a number of vendors, including Aqua-Aerobic Systems, Inc. (see www.aqua-aerobic.com).

In the preferred embodiment, the ceramic membrane filter 30 is operated in cross-flow filtration mode. As preferred, recycle pump 26 sends the SPAC/liquid slurry to the ceramic membrane filter 30 via slurry effluent line 22 at 10 times the influent flow rate or 10 Qi. The membranes of the ceramic membrane filter 30 separate the treated liquid from the SPAC and liquid slurry. The treated water is discharged as permeate via permeate line 32, preferably at the approximate rate of the initial influent rate of flow Qi. The SPAC and bulk liquid not discharged as permeate is discharged from ceramic membrane filter 30 as retentate (Qr) via retentate line 36, preferably at the rate of 9 times the initial flow or 9 Qi. The retentate is returned upstream of the sorption reactor 20, either to slurry feed line 15 or directly to sorption reactor 20. Among other things, the return of the SPAC laden retentate slurry increases the concentration of SPAC 12 in the sorption reactor 20, thereby requiring less virgin SPAC 12 to be added to the system. This also facilitates enhanced PFAS adsorption by the SPAC 12. Ceramic membrane filter 30 is also provided with a concentrate exit 37 in fluid communication with concentrate removal line 38 to remove spent SPAC 12 after breakthrough.

Importantly, pumping high velocity slurry at 10 Qi to the ceramic membrane filter 30, while only removing 1 Qi as permeate, scours the membranes 31 inside the ceramic membrane filter 30. This results in maintaining clean membranes 31 and a high permeability of the membranes 31. It also reduces the frequency of backwashing requirements. The high velocity through the ceramic membrane filter 30 further reduces the opportunity for bio-growth, which helps maintain filtering efficiency and reduces the need for frequent backwashing or chemical conditioning. In the preferred embodiment, where 10 Q is pumped 26 to the ceramic membrane filter 30, 1 Qi is removed as permeate via permeate line 32. As a result, 9 Q (9 Qr) is returned to the sorption reactor 20 as retentate via retentate line 36. It will be understood by those of skill in the art that these flows are exemplary and/or preferred and that other rates may be used consistent with the present inventions.

The foregoing describes the basic system and method for PFAS removal using SPAC, the sorption reactor 20 and a ceramic membrane filter 30 of the present inventions. In addition, a more comprehensive system of the present inventions is described herein by reference to FIG. 2. The system and method of SPAC thickening and removal is also described by reference to FIG. 2, although thickening and removal is also part of the basic system shown in FIG. 1.

Figure 2:
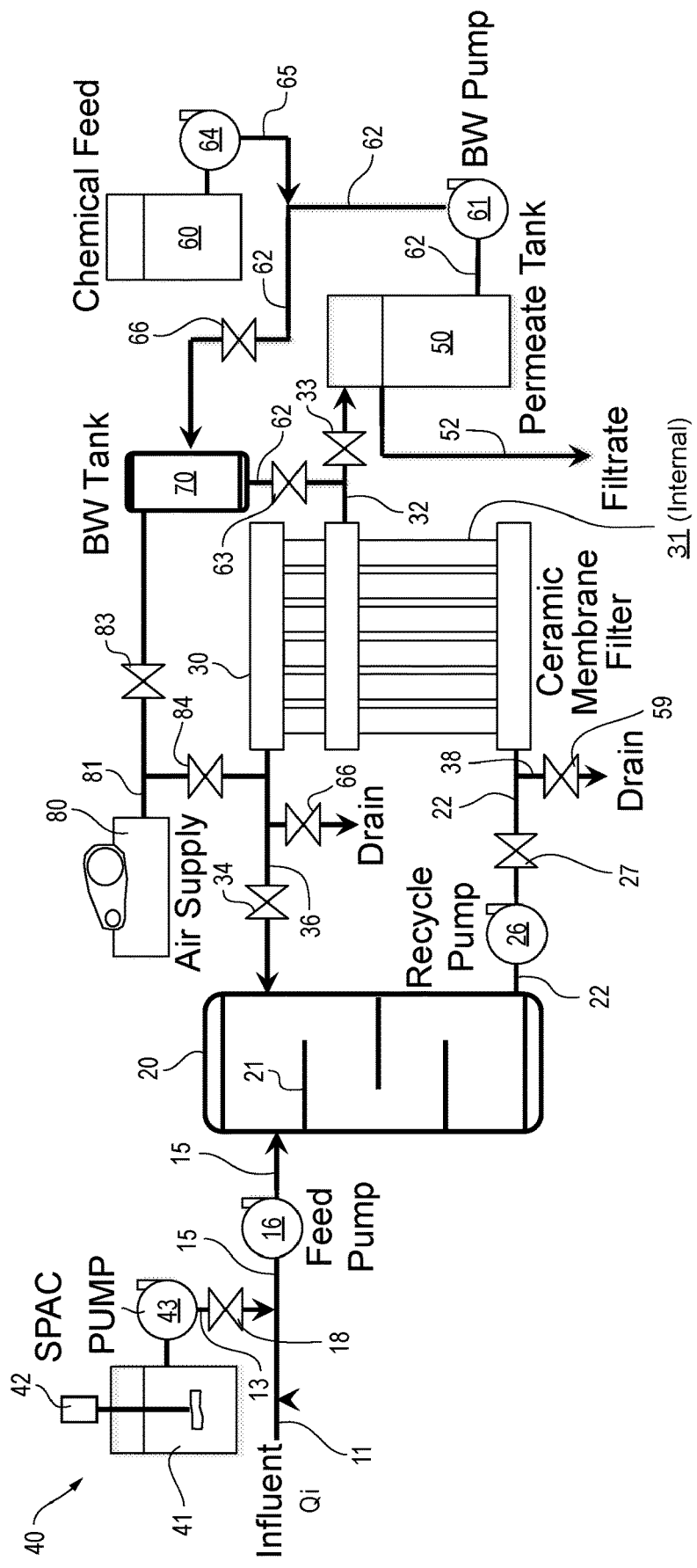
FIG. 2 is a schematic view of a more comprehensive preferred contaminant removal system of the present invention.

As shown in FIG. 2, a SPAC feed system 40 is provided as a substitute for the direct feed of SPAC 12 to influent line 11 and the use of optional mixer 14. The SPAC feed system 40 includes a tank 41 and a mixer 42 that mixes the SPAC slurry for use in the system. Specifically, in the preferred embodiment, a 10% SPAC slurry (e.g., 100 grams of carbon/liter) is added to tank 41 and mixed by mixer 42. The SPAC slurry is pumped from tank 41 using SPAC feed pump 43 through SPAC feed line 13 to influent line 11. The mixture or slurry, via slurry feed line 15, is then pumped using feed pump 16 to the sorption reactor 20, preferably at a rate of Qi. In a preferred embodiment, the 10% SPAC concentration is diluted to approximately 0.5-2 grams of carbon/liter in the sorption reactor 20. As shown schematically, a preferred sorption reactor 20 includes one or more baffles 21 to help prevent short-circuiting. Upon sufficient detention time for the SPAC 12 to adsorb the contaminants, the bulk liquid is pumped to ceramic membrane filter 30 via slurry effluent line 22 and recycle pump 26. Again, the preferred pumping is at 10 Qi into the ceramic membrane filter 30 and recycle pump 26 sized accordingly.

As with the embodiment of FIG. 1, the ceramic membrane filter 30 separates the permeate from the SPAC 12 and its adsorbed contaminants. The permeate is removed from the ceramic membrane filter 30 at a rate of 1 Qi via permeate line 32. In this embodiment, however, a permeate tank 50 is provided that is in fluid communication with permeate line 32. Permeate from ceramic membrane filter 30 is transferred to the permeate tank 50 and may be removed via permeate drain 52 as treated effluent or stored for use in backwashing as hereinafter described.

In the embodiment of FIG. 2, a backwash line 62 is in fluid communication with permeate tank 50 for removal of permeate for use in backwashing. A backwash pump 61 is also provided in backwash line 62. Backwash line 62 is in fluid communication with a backwash tank 70.

Backwash tank 70 is then in fluid communication with permeate line 32 of the ceramic filter membrane unit 30. When backwashing is desired or required, permeate is pumped from permeate tank 50 by backwash pump 61 to backwash tank 70. The permeate from backwash tank 70 flows from backwash line 62 to permeate line 32 which communications with the ceramic membrane filter 30. This reverses flow through the ceramic membrane filter 30 to backwash the membranes 31 as hereinafter described.

An optional chemical feed tank 60 may also be provided. Chemical feed tank 60 is in fluid communication with chemical feed line 65, which includes a chemical feed pump 64. Chemical feed line 65 is in turn in communication with backwash line 62. Chemical feed tank 60 contains a solution of chemicals that may be used when backwashing the membranes of ceramic membrane filter 30. Such chemicals may include NaOCl and citric acid to aid in cleaning the membranes. Other chemicals may be used as understood by those of skill in the art. Thus, when chemicals are desired for use in backwashing, the chemical solution is pumped by chemical feed pump 64, through chemical feed line 65 and into the permeate flow of backwash line 62.

In addition, an optional air supply 80 may be provided. Air supply 80 is in fluid communication with an air supply line 81. Air supply line 81 is in fluid communication with backwash tank 70 and retentate line 36. Air supply 80 may be provided in certain systems for use in backwashing. When backwashing is desired, air supply 80 pressurizes backwash tank 70 through air supply line 81 until a pressure setting is reached and then air valve 83 closes. Then backwash valve 63 is opened and releases the pressurized permeate from the backwash tank 70 through membrane filter 30 to help clean the membranes 31.

An important aspect of the present inventions is the thickening, dewatering and removal of the spent SPAC 12. A preferred system and method will be described by reference to FIG. 2. For PFAS and other organic contaminant removal, a flow of influent at a rate of Qi is introduced at influent line 11 (e.g., 100 gallons/minute). Using SPAC feed pump 43, the SPAC solution (e.g., 100 grams of carbon/liter) is pumped from SPAC tank 41 through an open SPAC feed valve 18 via SPAC feed line 13. The influent and SPAC slurry is pumped by feed pump 16 to sorption tank 20 via slurry feed line 15. The slurry is pumped into sorption reactor 20 at a rate of Qi. The SPAC 12 and influent slurry are detained in sorption reactor 20 for the desired retention time, whereby the PFAS and other contaminants are adsorbed into the SPAC 12. The concentration of SPAC 12 slurry in the sorption reactor 20 may be an exemplary 0.5-2 grams of carbon/liter.

The SPAC with adsorbed contaminants and bulk liquid slurry is transferred from sorption reactor 20 to the ceramic membrane filter 30 for filtration. Specifically, the slurry is pumped using recycle pump 26 along slurry effluent line 22, through open recycle valve 27 into the ceramic membrane filter 30. As previously discussed, recycle pump 26 is sized to pump 10 times the influent flow (10 Qi) into the ceramic membrane filter 30. The membranes of the ceramic membrane filter 30 separate the permeate from the SPAC/influent slurry.

The permeate is discharged from ceramic membrane filter 30 via permeate line 32 through open permeate valve 33 and into permeate tank 50 where it may be removed via permeate removal line 52. The retentate is removed from ceramic membrane filter 30 through retentate line 36 and open retentate valve 34 to be returned to sorption reactor 20. The retentate is returned to the sorption reactor 20 at a flow rate of Qr, which is 9 times the influent flow, or 9 Qi. During the typical filtration operation, backwash pump 51 is off, backwash valve 63 is closed and air supply valves 83, 84 are closed.

As indicated, an important aspect of the present inventions is the dewatering, thickening and removal of the spent SPAC 12 (and its adsorbed contaminants). When the SPAC has reached breakthrough, the influent flow into the system is shut off, feed pump 16 is off and SPAC feed valve 18 closed. Recycle pump 26 continues to operate and pumps the slurry at a rate of 10 Qi from sorption reactor 20. During the dewatering process, ceramic membrane filter 30 continues to remove permeate at a flow rate of 1 Qi and retentate continues to be returned to sorption reactor 20 at a rate of 9 Qi. After a certain amount of time, which is based upon the size (retention time) of the sorption reactor 20, the exhausted SPAC is sufficiently dewatered and concentrated to be removed for disposal. The desired concentration of SPAC 12 slurry when removed is, as an example, 10 grams of carbon/liter. If the concentration is too high, it is difficult to remove from the system.

It should also be noted that in practice, when concentrating the retentate for removal, after the influent flow Qi to the sorption reactor 20 is shut down, permeate is typically not removed at the full desired rate of 1 Q for the entire process. Instead, it is ramped down to less than 1 Q so that the retentate does not become too thick or concentrated for effective removal from the system.

When backwashing the membranes of the ceramic membrane filter 30 is required, the influent flow as described above for dewatering is halted. Recycle pump 26 is off and drain valve 39 is open. Permeate valve 33 is closed and backwash valve 63 and 66 are open. Backwash pump 61 is activated, drawing permeate from permeate tank 50. The permeate flows along backwash line 62 to backwash tank 70. If desired, chemicals may be added to the permeate along backwash line 62 via chemical feed line 65. The permeate or chemically enhanced permeate flows from backwash line 62 into permeate line 32 in a reverse flow from the permeate. The backwashed permeate goes through the ceramic membrane filter 30 in a reverse direction from filtration. The backwash liquid reverse flows to slurry effluent line 22 and is removed through open drain valve 59.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A method for removing contaminants from water comprising the steps of:
   1) providing a pressurized sorption reactor which is in fluid communication with an influent line accepting an influent flow of water to be treated and a sub-micron powdered activated carbon (SPAC) feed line in fluid communication with the influent line;
   2) adding 0.5 to 2.0 grams of carbon/liter (i.e. 500 to 2,000 mg of carbon/liter) of sub-micron powdered activated carbon (SPAC) to an influent flow of water to be treated in the influent line;
   3) combining the SPAC with the water to be treated, equating to 500 to 2,000 mg of carbon/liter of a volume of the pressurized sorption reactor;
   4) introducing a SPAC and water mixture into the pressurized sorption reactor for treatment, the pressurized sorption reactor having at least one horizontal baffle;
   5) permitting the mixture to remain in the pressurized sorption reactor for a maximum 30 to 60 minute retention time for the SPAC to adsorb contaminants in the water; and
   6) a slurry effluent line in communication with a discharge of the sorption reactor and a recycle pump in the slurry effluent line;
   7) transferring the mixture from the pressurized sorption reactor using the slurry effluent line and recycle pump to a ceramic membrane filter unit operating in cross-flow filtration wherein the treated water is discharged as permeate and the SPAC is returned to the pressurized sorption reactor as retentate;
   8) a permeate line in fluid communication with the ceramic membrane filter for removing the treated water as permeate;
   9) a permeate tank;
   10) a retentate line in fluid communication with the ceramic membrane filter and the sorption reactor to return the SPAC to the influent line;
   11) a concentrate line for removing SPAC;
   12) periodically backwashing the ceramic membrane filter using a backwash line in fluid communication with a backwash pump, a backwash valve, a backwash tank, the permeate tank and the permeate line;
   13) removing the SPAC and adsorbed contaminant concentrate from the ceramic membrane filter via the concentrate line upon the SPAC losing its capacity of adsorbing contaminants; and
   14) adding new SPAC to the influent flow of water to continue contaminant removal.

2. The method of claim 1 wherein the influent flow is 1 Q and the mixture of SPAC and influent is pumped at 10 times the influent (10 Q) from the pressurized sorption reactor to the ceramic membrane filter via the slurry line.

3. The method of claim 2 wherein the permeate is discharged at a rate of 1 times the influent flow from the ceramic membrane filter and the retentate is returned to the pressurized sorption reactor at a rate of 9 times the influent flow (9 Q).

4. The method of claim 3 wherein the SPAC has a mean particle diameter below approximately 1 micron.

5. The method of claim 1 wherein the SPAC and adsorbed contaminants are thickened for removal by terminating the influent flow to the pressurized sorption reactor and continuing operation of the recycle pump until the retentate is thickened and is thereafter removed via the concentrate line for disposal.

6. The method of claim 4 wherein the ceramic membrane filter has a nominal pore size barrier of approximately 0.1 microns.

* * * * *